United States Patent [19]
Cycon et al.

[11] Patent Number: 5,277,380
[45] Date of Patent: Jan. 11, 1994

[54] TOROIDAL FUSELAGE STRUCTURE FOR UNMANNED AERIAL VEHICLES HAVING DUCTED, COAXIAL, COUNTER-ROTATING ROTORS

[75] Inventors: James P. Cycon, Orange; Kenneth M. Furnes, Monroe; Fred W. Kohlhepp, Hamden; Marvin D. Farrell, Beacon Falls; David F. Sandy, West Haven, all of Conn.

[73] Assignee: United Technologies Corporation, Hartford, Conn.

[21] Appl. No.: 903,060

[22] Filed: Jun. 22, 1992

[51] Int. Cl.⁵ .......................................... B64C 39/06
[52] U.S. Cl. .................................................. 244/12.2
[58] Field of Search ............... 244/12.2, 23C, 117 R, 123, 30, 36, 52, 129.4, 131, 132; 415/173.1

[56] References Cited

U.S. PATENT DOCUMENTS

| | | | |
|---|---|---|---|
| 2,392,835 | 1/1940 | Conlon | 244/129.4 |
| 2,863,621 | 12/1958 | Davis | 244/23 C |
| 2,953,320 | 9/1960 | Parry | 244/52 |
| 3,103,327 | 9/1963 | Parry | 244/52 |
| 3,199,809 | 8/1965 | Modesti | 244/23 C |
| 4,274,806 | 6/1981 | Gallardo | 415/173.1 |
| 4,780,052 | 10/1988 | Pradello | 415/173.1 |
| 5,035,377 | 7/1991 | Buchelt | 244/23 C |
| 5,150,857 | 9/1992 | Moffitt et al. | 244/23 G |

*Primary Examiner*—Galen L. Barefoot
*Attorney, Agent, or Firm*—Terrance J. Radke

[57] ABSTRACT

An unmanned aerial vehicle having a toroidal fuselage structure that surrounds a pair of coaxial, multi-bladed, counter-rotating rotors. The toroidal fuselage structure is optimized to provide a highly efficient structure for reacting aerodynamic flight loads and rotor thrust loads of the UAV. The toroidal fuselage structure is further optimized to provide weight efficiency for minimizing power requirements.

15 Claims, 6 Drawing Sheets

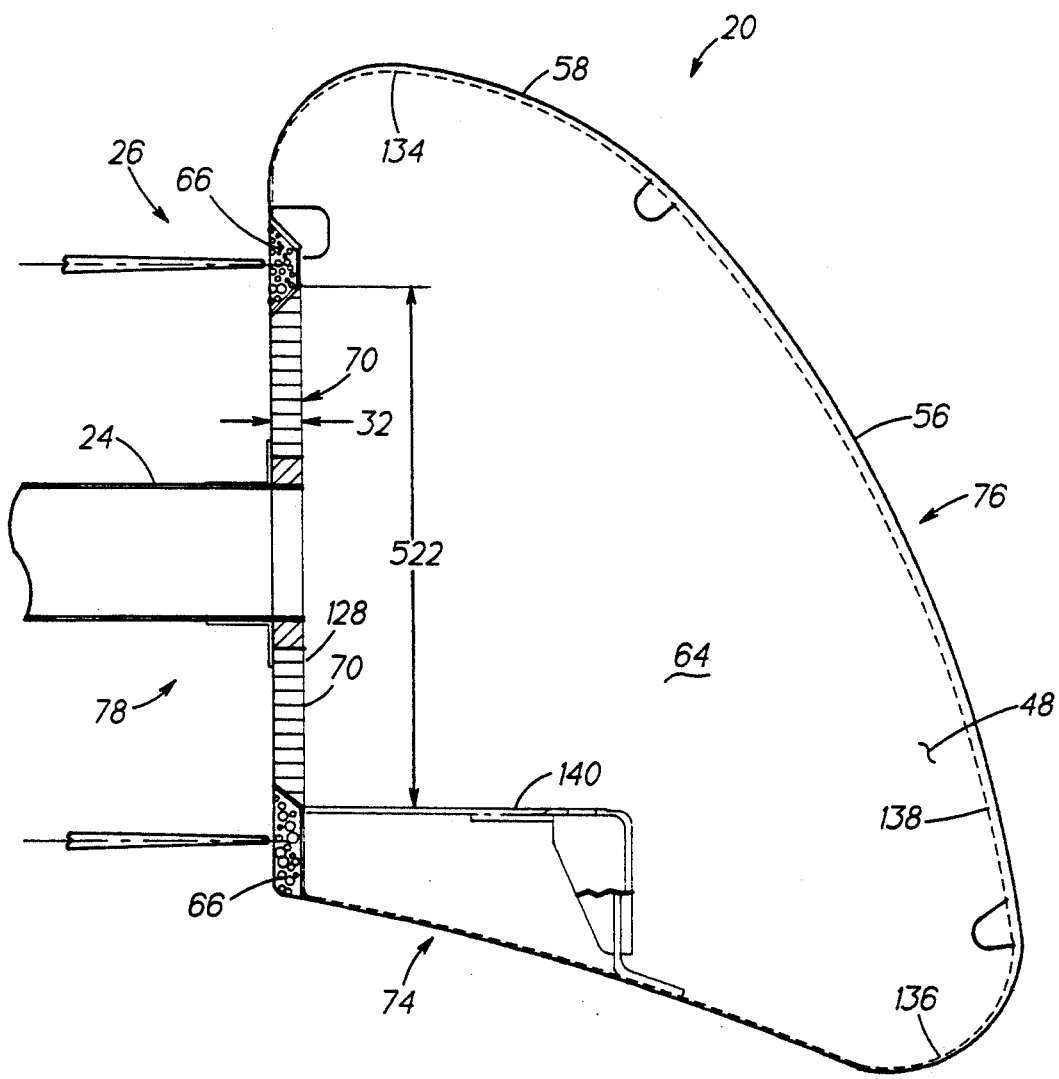

TOROIDAL FUSELAGE STRUCTURE FOR UNMANNED AERIAL VEHICLES HAVING DUCTED, COAXIAL, COUNTER-ROTATING ROTORS

RELATED APPLICATIONS

The present application is related to commonly-owned U.S. Pat. No. 5,150,857 entitled SHROUD GEOMETRY FOR UNMANNED AERIAL VEHICLES, to commonly-owned U.S. Pat. No. 5,152,478 entitled AN UNMANNED FLIGHT VEHICLE INCLUDING COUNTER ROTATING ROTORS POSITIONED WITHIN A TOROIDAL SHROUD AND OPERABLE TO PROVIDE ALL REQUIRED VEHICLE FLIGHT CONTROLS, to commonly-owned, co-pending U.S. patent application Ser. No. 07/903,061, filed Jun. 22, 1992, entitled A ROTOR BLADE SUBASSEMBLY FOR A ROTOR ASSEMBLY HAVING DUCTED, COAXIAL COUNTER-ROTATING ROTORS to commonly-owned, co-pending U.S. patent application Ser. No. 07/903,063, filed Jun. 22, 1992, entitled A SNUBBER ASSEMBLY FOR A ROTOR ASSEMBLY HAVING DUCTED, COAXIAL COUNTER-ROTATING ROTORS, to commonly-owned, copending U.S. patent application Ser. No. 07/903,064, filed Jun. 22, 1992, entitled AN INTEGRATED SPLINE/CONE SEAT SUBASSEMBLY FOR A ROTOR ASSEMBLY HAVING DUCTED, COAXIAL COUNTER-ROTATING ROTORS, to commonly-owned, co-pending U.S. patent application Ser. No. 07/903,065, filed Jun. 22, 1992, entitled A COAXIAL TRANSMISSION/CENTER HUB SUBASSEMBLY FOR A ROTOR ASSEMBLY HAVING DUCTED, COAXIAL COUNTER-ROTATING ROTORS, to commonly-owned, co-pending U.S. patent application Ser. No. 07/903,066, filed Jun. 22, 1992, entitled A DRIVE TRAIN ASSEMBLY FOR A ROTOR ASSEMBLY HAVING DUCTED, COAXIAL COUNTER-ROTATING ROTORS.

TECHNICAL FIELD

The present invention relates to unmanned aerial vehicles (UAVs), and more particularly, to an optimized toroidal fuselage structure for a UAV having a toroidal fuselage (shroud) and a pair of coaxial, counter-rotating, ducted, multi-bladed rotors.

BACKGROUND OF THE INVENTION

There has been a recent resurgence in the interest in unmanned aerial vehicles (UAVs) for performing a variety of missions where the use of manned flight vehicles is not deemed appropriate, for whatever reason. Such missions include surveillance, reconnaissance, target acquisition and/or designation, data acquisition, communications datalinking, decoy, jamming, harassment, or one-way supply flights. This interest has focused mainly on UAVs having the archetypical airplane configuration, i.e., a fuselage, wings having horizontally mounted engines for translational flight, and an empennage, as opposed to "rotor-type" UAVs, for several reasons.

First, the design, fabrication, and operation of "winged" UAVs is but an extrapolation of the manned vehicle flight art, and therefore, may be accomplished in a relatively straightforward and cost effective manner. In particular, the aerodynamic characteristics of such UAVs are well documented such that the pilotage (flight operation) of such vehicles, whether by remote communications datalinking of commands to the UAV and/or software programming of an on-board flight computer, is relatively simple.

In addition, the range and speed of such UAVs is generally superior to rotor-type UAVs. Moreover, the weight-carrying capacity of such UAVs is generally greater than rotor-type UAVs such that winged UAVs may carry a larger mission payload and/or a larger fuel supply, thereby increasing the vehicle's mission efficiency. These characteristics make winged UAVs more suitable than rotor-type UAVs for certain mission profiles involving endurance, distance, and load capability. Winged UAVs, however, have one glaring deficiency that severely limits their utility.

More specifically, winged UAVs do not have a fixed spatial point "loiter" capability. For optimal performance of many of the typical mission profiles described hereinabove, it is desirable that the UAV have the capability to maintain a fixed spatial frame of reference with respect to static ground points for extended periods of time, e.g., target acquisition. One skilled in the art will appreciate that the flight characteristics of winged UAVs are such that winged UAVs cannot maintain a fixed spatial frame of reference with respect to static ground points, i.e., loiter. Therefore, mission equipment for winged UAVs must include complex, sensitive, and costly motion-compensating means to suitably perform such mission profiles, i.e., maintenance of a constant viewing azimuth for static ground points.

Rotor-type UAVs, in contrast, are aerodynamically suited for such loiter-type mission profiles. The rotors of the main rotor assembly of such UAVs may be operated so that the UAV hovers at a fixed spatial frame of reference with respect to static ground points. Maximum hover efficiency is typically achieved through the use of a shrouded duct configuration. The duct acts to direct the rotor-driven air in an almost purely downward direction, thereby providing aircraft lift.

Prior art ducted rotor-type UAV designs have utilized various structural configurations to shroud the rotors within the fuselage of the aircraft, wherein one such configuration utilizes a toroidal fuselage structure. Toroidal structures are generally closed-cell, continuous ring shapes having inherently high structural stiffness. Examples of such a toroidal fuselage structure are described in commonly-owned U.S. Pat. No. 5,152,478, entitled AN UNMANED FLIGHT VEHICLE INCLUDING COUNTER ROTATING ROTORS POSITIONED WITHIN A TOROIDAL SHROUD AND OPERABLE TO PROVIDE ALL REQUIRED VEHICLE FLIGHT CONTROLS, and commonly-owned U.S. Pat. No. 5,150,857, entitled GEOMETRY FOR UNMANNED AERIAL VEHICLES. In general, prior art ducted rotor-type UAVs have not addressed the design considerations necessary for achieving structural and lightweight efficiency.

One prior art toroidal fuselage structure utilized a substantially flat duct portion with removable C-shaped cover portions attached around its periphery. The cover portions were stiffened through the use of equally spaced bulkhead structures that were riveted thereon. These bulkhead structures were needed to react the loads associated with the high suction profile that exists on the upper surface of the toroidal structure. The flat duct portion consisted of a continuous honeycomb sandwich structure for preventing bending of the duct due to the suction loads and furthermore for supporting mission payload equipment and subassemblies that were mounted directly thereon. Since the duct portion alone lacked sufficient strength to accommodate all flight loads, it was necessary that the cover portions be sufficiently stiff and structurally strong to react loads tending to distort the fuselage contour (in a circumferential direction). The configuration resulted in an extremely heavy solution.

Prior toroidal shroud configurations also employed a variety of strut configurations to attach the rotor assembly to the fuselage. A four strut configuration was thought to be sufficient to transfer rotor loads efficiently, however this combination resulted in severe deflections of the strut members and distortion or "egging" of the toroidal fuselage. The distortion of the toroidal fuselage may result in blade contact with the duct wall. Structural modifications to stiffen the toroidal fuselage add additional weight to the aircraft and, consequently, require more power to operate, a luxury that rotary-type UAVs do not have.

A need, therefore, exists for providing an optimized toroidal fuselage configuration which provides a high bending stiffness and structural strength while maintaining a lightweight design.

SUMMARY OF THE INVENTION

One object of the present invention is to provide an unmanned rotary-type aerial vehicle (UAV) having an optimized toroidal fuselage structure and removable panel structures for providing accessibility to mission equipment located within.

Another object of the present invention is to provide a UAV having an optimized toroidal fuselage structure while minimizing aircraft weight.

Yet another object of the present invention is to provide a UAV having an optimized toroidal fuselage structure with improved bending stiffness to minimize structural distortion.

Still another object of the present invention is to provide a UAV having an optimized toroidal fuselage structure with a substantially rigid strut attachment point to minimize motion of a rotor assembly with respect to the fuselage structure, while efficiently transferring loads from the mission payload equipment.

Yet another object of the present invention is to provide a UAV having an optimized toroidal fuselage structure with a sacrificial element for protecting the duct wall surface from rotor blade strikes.

The unmanned aerial vehicle (UAV) of the present invention includes a toroidal fuselage structure that is optimized to provide maximum structural strength while minimizing the aircraft weight. The UAV also includes a rotor assembly, a powerplant subassembly, and flight/mission equipment. The rotor assembly includes a pair of multi-bladed, counter-rotating rotors coaxially aligned with the axis of the toroidal fuselage such that the rotors are "shrouded" by the toroidal fuselage.

The toroidal fuselage has a plurality of support strut members integrally formed with and extending radially inboard from the inner periphery of the toroidal fuselage to the rotor assembly for rigid attachment thereto to support the rotor assembly in a fixed coaxial relation to the toroidal fuselage. The support struts are hollow to minimize the overall weight of the UAV. The toroidal fuselage and the plurality of support strut members are preferably fabricated from composite material to provide a high strength structure of minimal weight. The toroidal fuselage is fabricated as a closed toroid to provide maximum structural strength. The toroidal fuselage is partially hollow, and fabricated as a open-faced annular C-shaped structure with removable panel structures so as to provide accessible internal equipment bays.

Bulkhead pairs are disposed equally about and located within the C-shaped structure. Each pair is affixed to the toroidal structure at the attachment point of a strut member and, in conjunction with duct stiffening structures, form substantially rigid box structures for reacting the propulsive rotor loads imposed on the toroidal fuselage structure through the strut members. Horizontal mounting plates disposed between and affixed to the bulkhead pairs serve to further stiffen the rigid box structures, while additionally providing a mounting surface for vehicle subassemblies and mission equipment.

The duct wall portion of the toroidal fuselage structure has circumferential stiffening structures formed thereon to provide increased bending stiffness and enhance the overall rigidity of the fuselage structure for minimizing distortion or "egging" of the duct wall. The duct wall additionally has a plurality of vertical stiffening structures to further stiffen the overall toroidal fuselage structure thereby forcing the toroid to act as a complete structure in bending. The vertical stiffening structures furthermore stabilize the duct wall portion against deformation due to suction loads induced by the rotor downwash. Vertically oriented mounting plates are affixed to the vertical stiffening structures for mounting mission equipment.

Rub strip members are disposed within pockets formed by the circumferential stiffening structures and are located in a tip path plane defined by rotation of the tip end portions of the rotor blades. The rub strip members act as sacrificial elements to protect the duct wall portion from blade contact.

Removable panel structures are mounted to the ends of the C-shaped structure to complete the toroidal fuselage structure, while providing a means for accessing the inner cavity of the C-shaped structure. The edges of the removable panels have a mating interface at their attachment to the bulkhead pairs. The mating interface is a sawtooth configuration for minimizing the number of fasteners necessary to attach the removable panels.

BRIEF DESCRIPTION OF THE DRAWINGS

A more complete understanding of the present invention and the attendant features and advantages thereof may be had by reference to the following detailed description of the invention when considered in conjunction with the accompanying drawings wherein:

FIG. 4d is a cross-sectional view along line 4d—4d of FIG. 2.

DETAILED DESCRIPTION OF PREFERRED EMBODIMENTS

Figure 1:
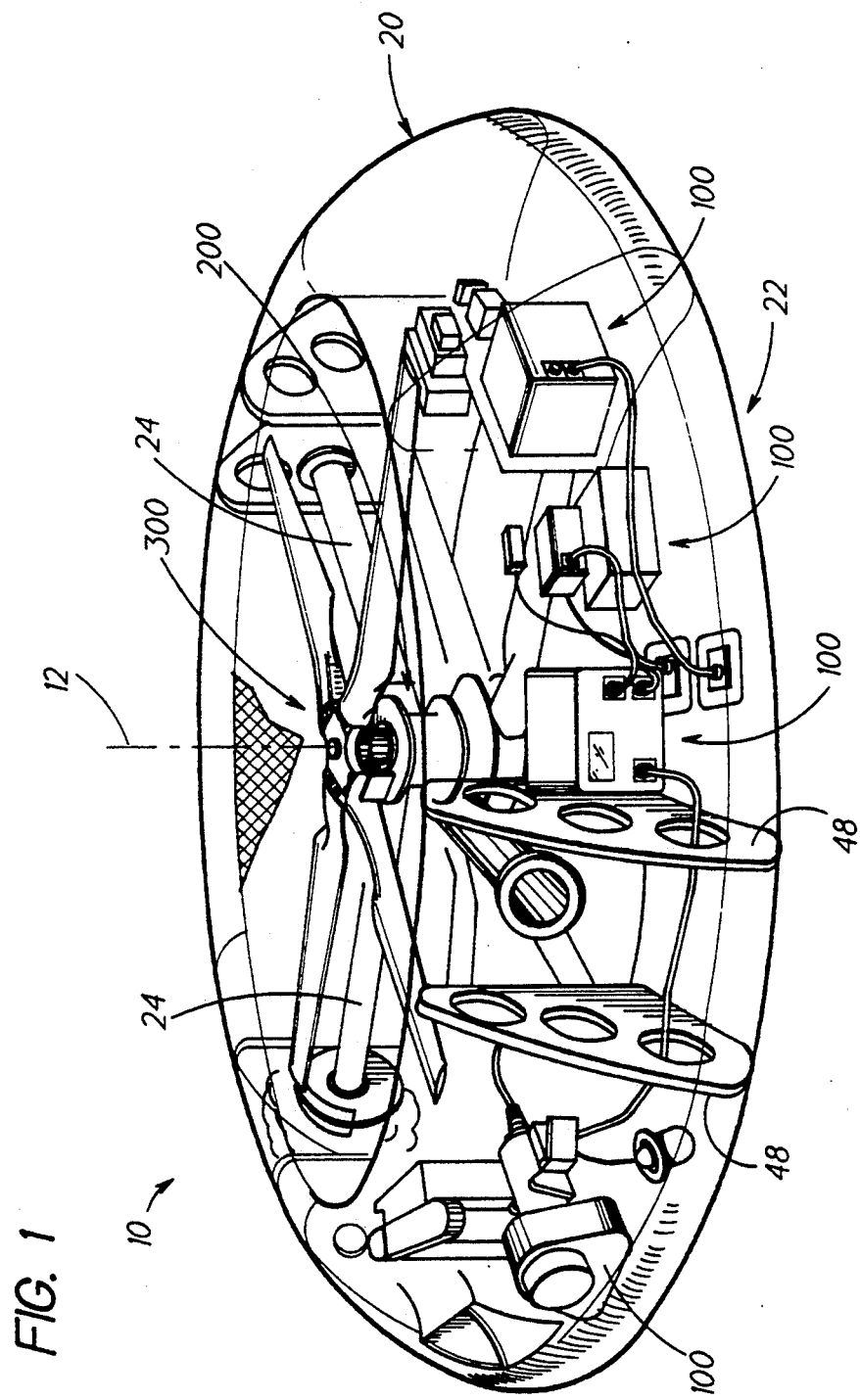
FIG. 1 is a perspective, partially broken away view of one embodiment of an unmanned aerial vehicle (UAV) according to the present invention.

Referring now to the drawings wherein like reference numerals illustrate corresponding or similar elements throughout several views, FIG. 1 shows a UAV 10 comprising a toroidal fuselage or shroud structure 20 having an aerodynamic profile 22, flight/mission equipment 100, a powerplant subsystem 200, a rotor assembly 300, and a rotor axis 12.

The aerodynamic profile 22 of the toroidal fuselage 20 of the described embodiment may be optimized to minimize nose-up pitching moments during forward translational flight. One preferred aerodynamic profile 22 for the illustrated UAV 10 is described in further detail in commonly-owned U.S. Pat. No. 5,150,857, entitled SHROUD GEOMETRY FOR UNMANNED AERIAL VEHICLES, Which is incorporated herein by reference. Details of the powerplant and rotor assembly are described in commonly-owned, co-pending U.S. patent application Ser. No. 07/903,061, filed Jun. 22, 1992, entitled A ROTOR BLADE SUBASSEMBLY FOR A ROTOR ASSEMBLY HAVING DUCTED, COAXIAL COUNTER-ROTATING ROTORS, commonly-owned, co-pending U.S. patent application Ser. No. 07/903,063, filed Jun. 22, 1992, entitled A SNUBBER ASSEMBLY FOR A ROTOR ASSEMBLY HAVING DUCTED, COAXIAL COUNTER-ROTATING ROTORS, commonly-owned, co-pending U.S. patent application Ser. No. 07/903,064, filed Jun. 22, 1992, entitled AN INTEGRATED SPLINE/CONE SEAT ASSEMBLY FOR A ROTOR ASSEMBLY HAVING DUCTED, COAXIAL COUNTER-ROTATING ROTORS commonly-owned, co-pending U.S. patent application Ser. No. 07/903,065, filed Jun. 22, 1992, entitled A COAXIAL TRANSMISSION/CENTER HUB SUBASSEMBLY FOR A ROTOR ASSEMBLY HAVING DUCTED, COAXIAL COUNTER-ROTATING ROTORS, commonly-owned, co-pending U.S. patent application Ser. No. 07/903,066, filed Jun. 22, 1992, entitled A DRIVE TRAIN ASSEMBLY FOR A ROTOR ASSEMBLY HAVING DUCTED, COAXIAL COUNTER-ROTATING ROTORS which are also incorporated herein by reference.

The UAV 10 described herein has a toroidal fuselage structure diameter of about 6.5 feet, a toroidal fuselage 20 envelope height of about 1.6 feet, an empty vehicle weight of about 175 pounds, and a gross vehicle weight of about 250 pounds.

The rotor assembly 300 includes two counter-rotating propulsive rotors (the lower rotor is obscured by the upper rotor in FIG. 2), which coaxially mounted within a duct 26 formed by the toroidal fuselage 20, which direct airflow downward through the duct 26 of the toroidal fuselage structure. Each rotor includes four rotor blades 30 having tip end portions 32 in close proximity to the duct wall portion 26W, which tip end portions define a tip path plane 34 when the rotor is turning. The close proximity of the tip end portions 32 to the duct wall portion 26W minimizes or suppresses rotor blade tip vortices thus improving propulsive efficiency.

Figure 2:
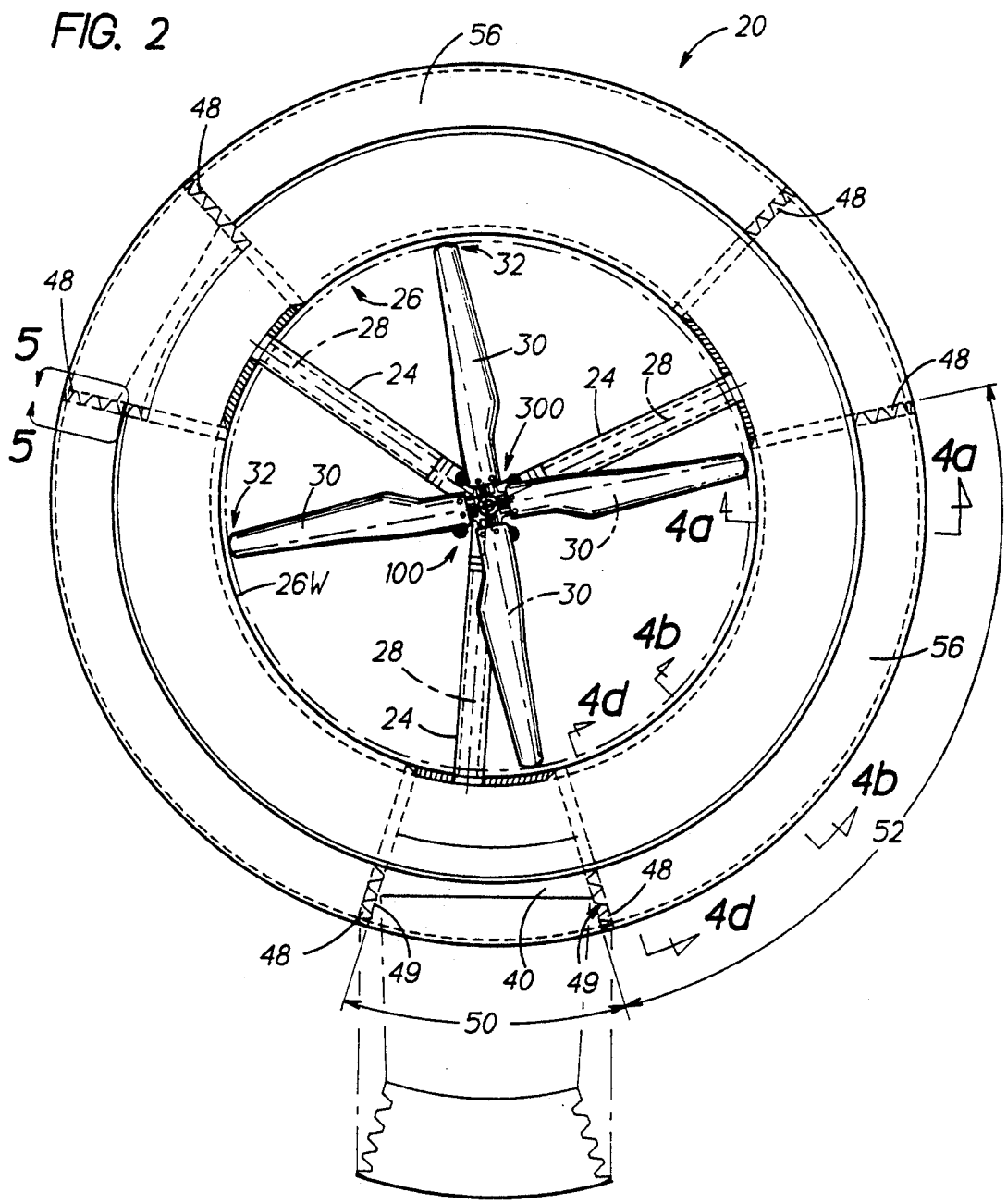
FIG. 2 is a top plan view of the UAV according to the present invention.

As best shown in FIG. 2, the rotor assembly 300 is supported by a plurality of support strut members 24 which mount to the inner periphery or duct wall portion 26W of the toroidal fuselage structure. The longitudinal axes 28 of each strut member is radially aligned with respect to the rotor axis 12 and form 120 degree sectors therebetween. Also shown are three pairs of bulkhead structures 48 which are equally spaced about and located within the toroidal fuselage structure 20. Horizontal support plates 40 are affixed to side wall portions 49 of each pair of bulkhead structures 48 for mounting the heaviest vehicle subsystems and mission payload equipment e.g. engine, surveillance camera etc.

Each pair of bulkhead structures 48 defines a first region 50 therebetween which is intersected by the longitudinal axis 28 of the corresponding strut member 24. A second region 52 is defined between adjacent pairs of bulkhead structures 48. The first region 50 preferably forms, a sector of the toroidal fuselage structure not greater than about 45 degrees and, still more preferably, forms a sector less than about 30 degrees. Such bulkhead spacing creates a substantially rigid structural box section for reacting lift loads from the propulsive rotor 300, which loads are transferred to the toroidal fuselage 20 through the strut member 24. Since the rigidity of the first region 50 is dependent on the sector size, a relatively small sector size, as compared to the second region 52, is preferable. For a toroidal structure having three pairs of bulkhead structures 48, each second region 52 will preferably form a sector greater than about 75 degrees. It will be apparent, however, that a greater number of bulkhead pairs will necessarily decrease the sector size of the second region.

The toroidal fuselage structure 20 and the plurality of support strut members 24 are preferably fabricated from composite material to produce a high strength structure while minimizing aircraft weight. The various types of high tensile strength fibrous materials and resins having utility in the formation of aerospace composite structures are well known to those skilled in the art. The toroidal fuselage 20 is fabricated as a closed toroid to provide maximum structural strength and stiffness. The toroidal fuselage 20 is a partially hollow structure, and fabricated as such so as to provide an internal cavity 64 (see FIG. 3) for mounting mission equipment 100, and powerplant subassemblies 200. Accessibility to the internal cavity 64 is provided through removable panel structures 56 of the toroidal fuselage structure 20.

Figure 3:
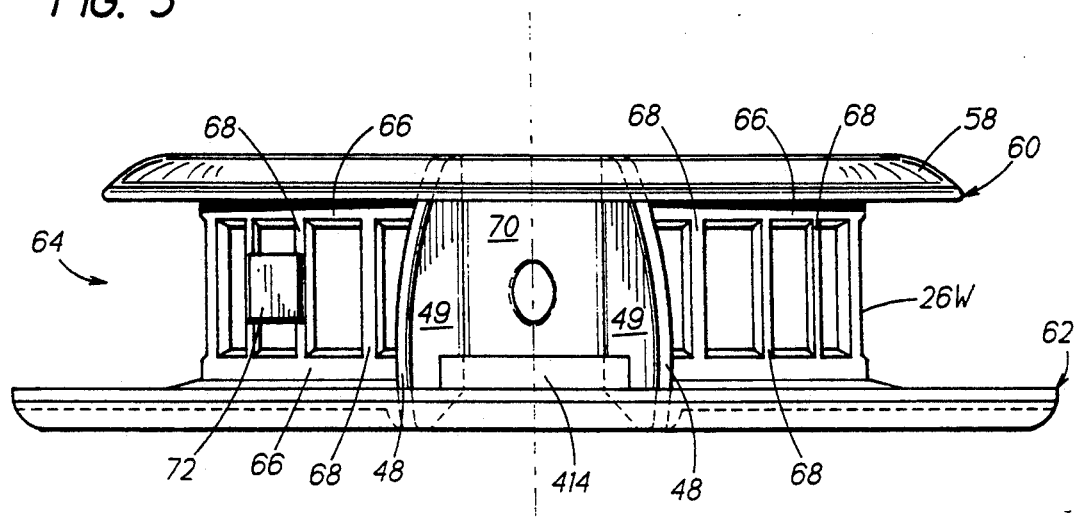
FIG. 3 is a profile view of the open-faced annular structure of the present invention.
Figure 4A:
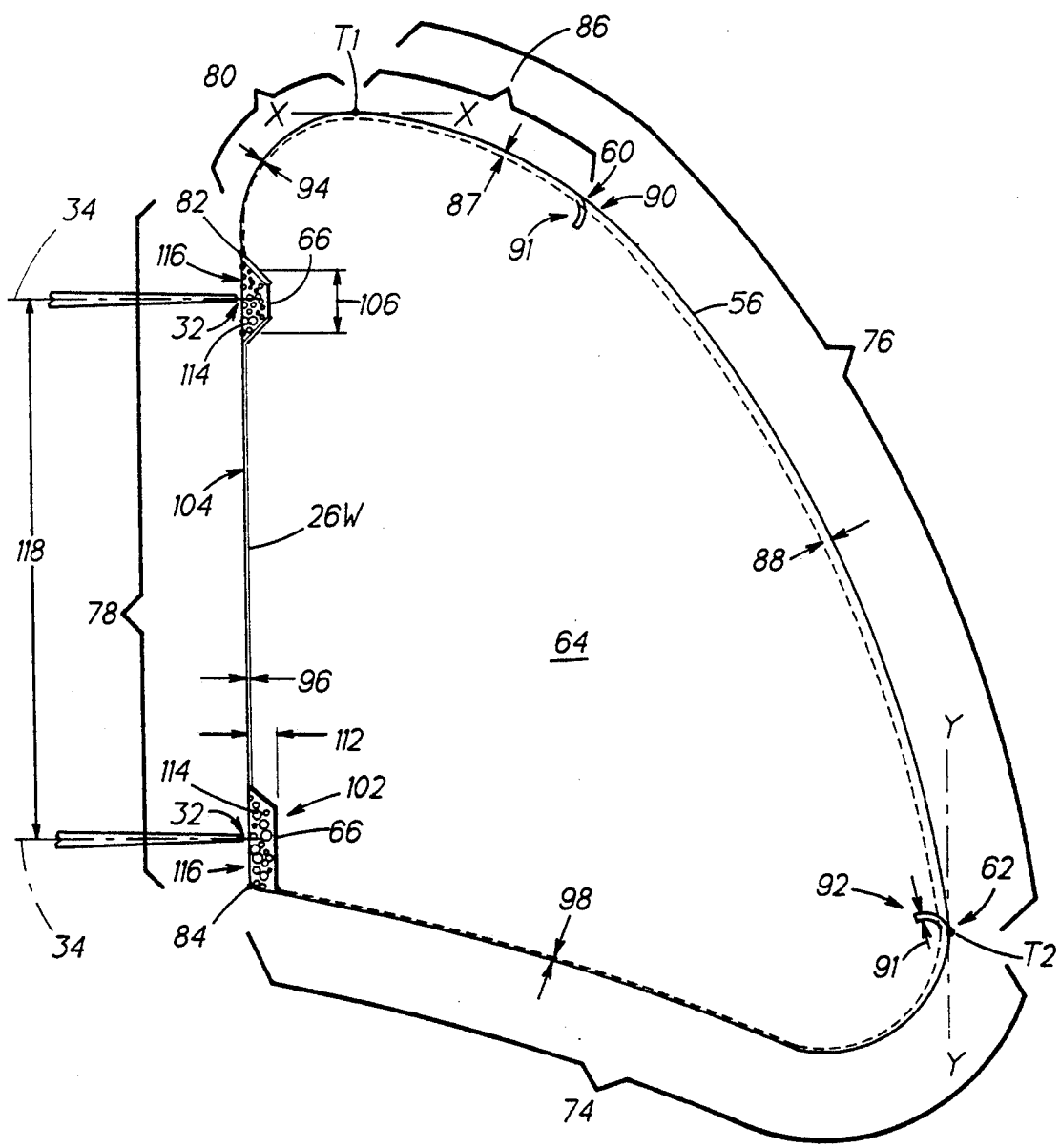
FIG. 4a is a cross-sectional view along line 4a—4a of FIG. 2.

The primary portion of the toroidal fuselage structure 20 is best shown in FIG. 3 and forms an open-faced annular structure 58 forming a C-shaped structure having first and second ends thereof, 60 and 62, respectively (see also FIG. 4a). The C-shaped structure forms the internal cavity 64, and the duct wall portion 26W. The annular structure 58, in combination with the pairs of bulkhead structures 48 forms the primary structural element of the toroidal fuselage structure 20.

The duct wall portion 26W of the C-shaped structure 58 preferably includes upper and lower circumferential stiffening structures 66 integrally formed thereon and disposed within the internal cavity 64 for providing a continuous, stiff load path around the circumference of the duct wall portion 26W thus providing additional bending strength. The duct wall portion 26W furthermore has a plurality of equally spaced vertical stiffening structures 68 formed thereon and disposed within the internal cavity 64 of the second region 52. Adjacent vertical stiffening structures 68 are preferably separated by about 15 degrees. The duct wall portion 26W additionally includes a duct stiffening structure 70 formed thereon and located within the internal cavity 64 of each first region 50 and between the upper and lower circumferential stiffening structures 66. The duct stiffening structure 70 preferably extends between and serves as a mounting surface for each pair of bulkhead structures 48. The duct stiffening structure 70, acting in combination with the corresponding pair of bulkhead structures 48, provides a substantially rigid box structure for reacting the propulsive rotor loads transferred into the toroidal fuselage structure 20 through the strut member 24.

The horizontal support plates 40 are affixed to the side wall portions 49 of respective bulkhead structures 48 as described hereunder to provide provide enhanced box structure stiffness. Moreover, the horizontal support plates 40 provide a structural load path for transferring the weight of the vehicle subassemblies and mission payload equipment to the box structure.

Vertically oriented mounting plates 72 may be utilized to attach additional vehicle subassemblies, e.g., sundry flight/mission equipment powerplant subsystem, etc., within the internal cavity 64 in one or more of the second region 52. Each mounting plate 72 is preferably affixed to at least two adjacent vertical stiffening structures 68 thereby providing a suitable means for reacting the weight of the attached subassembly. It should be understood that subassemblies and mission equipment may also be mounted directly to the vertical stiffening structures 68.

A cross-section along line 4a—4a of FIG. 2 of the toroidal structure 20 is shown in FIG. 4a and identifies three structural portions of the toroidal fuselage structure 20, which portions include the duct wall portion 26W, a lower dorsal portion 74 and a closure portion 76 connecting the end of the dorsal portion 74 to the upper end of the duct wall portion 26W. The duct wall portion 26W has a substantially cylindrical main section 78 that has the longitudinal axis thereof coaxial with the rotor axis 12. The duct wall portion furthermore has a upper lip section 80 extending from an upper end 82 of the cylindrical main section 78.

The dorsal portion 74 extends radially outboard from a lower end 84 of the cylindrical main section 78 of the duct wall portion 26W. The duct wall portion 26W and the dorsal portion 74 of the toroidal fuselage structure form the primary open-faced annular structure 58 having a generally C-Shaped cross-section.

The closure portion 76 is defined by two points of tangency T1 and T2 where horizontal and vertical lines XX and YY intersect the uppermost and radially outermost portions of the toroidal fuselage structure 20, respectively. Preferably the upper region 86 of the closure portion is integral with and smoothly transitions from the upper lip section 80 of the duct wall portion 26W. The continuation of the C-shaped structure 58 including the upper region 86 of the closure portion 76 provides added bending stiffness and moves the first end 60 of the C-shaped structure 58 away from the suction profile. The structural stiffness of the annular C-shaped structure 58 may further be enhanced by extending the lower dorsal portion 74. However fabrication of the C-shaped structure 58 may be adversely affected. The closure portion 76 furthermore includes removable panel structures 56 for providing access to the internal cavity 64, and is of a sufficient size to facilitate the placement and removal of flight mission equipment 100, and powerplant subassemblies 200.

In the preferred embodiment of the C-shaped structure 58 described herein, the cylindrical main section 78 of the duct wall portion 26W is fabricated from a continuous layup of six plies of graphite/epoxy material having a total thickness dimension 96 of about 0.030 inches. The cylindrical main section 78 additionally forms the upper and lower circumferential stiffening structures 66 located within the internal cavity 64, resulting in a pocket 102 on the inboard surface 104 of the cylindrical main section 78. The pocket has an average width dimension 106 of about 1.5 inches and a depth dimension 112 of about 0.50 inches. Tapering of the pocket along its depth 112 is provided to facilitate manufacture.

A rub strip member 114 is disposed within the pocket, and is preferably formed of a conventional foam material. The rub strip member is of a thickness and shape so as to fill the pocket completely. Accordingly, the inboard surface 116 of the rub strip member 114 lies substantially flush with the inboard surface 104 of the cylindrical main section 78. The rub strip member 114 acts as a sacrificial element to protect the duct wall portion 26W from blade contact. The rub strip member 114 furthermore lies in the tip path plane 34 defined by the path that is formed by the blade tip end portions 32 as the blades rotate. In the preferred embodiment, the rotor assembly 300 includes two counter-rotating rotors which results in two tip path planes 34 that are separated by a vertical distance 118 of approximately 11.0 inches. Preferably the blade tip end portions 32 are in close proximity to the inboard surface 104 of the cylindrical main section 78, so as to minimize or suppress rotor blade tip vortices for improved propulsive efficiency.

The upper lip section 80 is preferably fabricated from six plies of graphite/epoxy material with a total thickness dimension 94 of approximately 0.030 inches, providing sufficient strength to react the suction loads applied to the upper lip section during flight. The lower dorsal portion 74 is preferably fabricated from six plies of graphite/epoxy material with a total thickness 98 of approximately 0.030 inches.

In the preferable embodiment, the closure portion 76 is fabricated from graphite/epoxy material, with the upper region 86 of the closure portion being fabricated with six plies having a thickness dimension 87 of approximately 0.030 inches. The removable panel structure 56 is fabricated with three plies having a thickness dimension 88 of approximately 0.015 inches. The attachment of the removable panel structure 56 of the closure portion 76 to the first and second ends, 60 and 62, respectively of the continuous C-shaped structure may be accomplished through the any number of methods known to one skilled in the art.

The first and second ends, 60 and 62, of the continuous C-shaped structure 58 have reverse flange portions, 90 and 92, respectively, integral therewith. The reverse flange portions 90, 92 provide increased buckling and crippling strength of the first and second ends, and also assist in transferring the loads applied thereto from the removable panel structure 56 of the closure portion. The reverse flanges have an additional ply buildup so as to result in a total thickness 91 of approximately 0.045 inches. layup that forms the duct wall portion 26W so as to form an integral stiffening structure for transferring loads. During manufacture of the toroidal fuselage structure 20, the core 69 is placed within the ply layup, and preferably has three of the six duct wall plies on both sides of the core 69.

A cross section along section 4d–4d of FIG. 2 is shown in FIG. 4d and depicts the toroidal fuselage structure 20 at the location of the duct stiffening structure 70 located within one first region 50 of the internal cavity 64. The duct stiffening structure 70 is shown to extend between the upper and lower circumferential stiffening structures 66 and is furthermore integrally formed on the cylindrical main section 78 of the duct wall portion 26W. The duct stiffening structure 70 increases the bending stiffness of the overall toroidal fuselage structure 20 and, more specifically, by working in combination with pairs of bulkhead structures 48, provides a substantially rigid box structure for the attachment of the strut member 24. The rigid attachment of the strut member 24 to the toroidal fuselage structure 20 minimizes the relative motion of the propulsive rotor assembly 300 with respect to the toroidal fuselage structure 20 and provides a structural load path for transferring loads from the propulsive rotor 300.

Figure 4B:
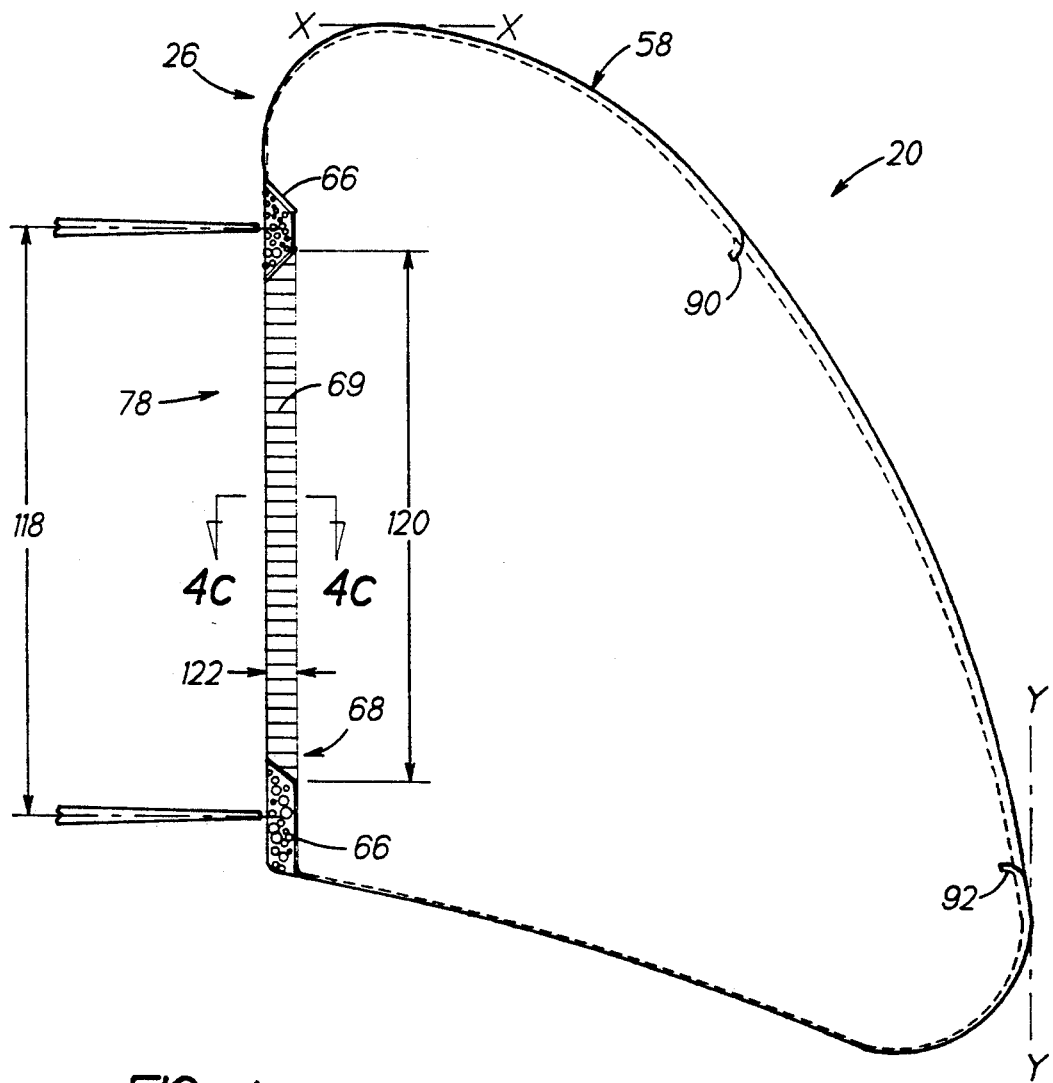
FIG. 4b is a cross-sectional view along line 4b—4b of FIG. 2.

The duct stiffening structure 70 is preferably fabricated from a honeycomb sandwich structure having one face sheet 128 comprising three plies of graphite/epoxy having a thickness of about 0.015 inches. The duct stiffening structure 70 has a height dimension 130 sufficient to meet the upper and lower circumferential stiffening structures 66. The width dimension 132 of the duct stiffening structure A cross section along section 4b–4b of FIG. 2 is shown in FIG. 4b and depicts the toroidal fuselage structure 20 at the location of one vertical stiffening structure 68 in the second region 52. The vertical stiffening structure 68 is shown to extend between the upper and lower circumferential stiffening structures 66 and is furthermore integrally formed on the duct wall portion 26W of the internal cavity 64. The vertical stiffening structures 68 serve to stiffen the overall toroidal fuselage structure 20 forcing the toroid to act as a complete structure in bending. Furthermore, the vertical stiffening structures 68 stabilize the duct wall portion 26W, for preventing deformation due to suction forces induced by rotor downwash. The vertical stiffening structure 68 is preferably fabricated to include a core 69 of conventional foam material, the core 69 having a stiffener height dimension 120 sufficient to meet the upper and lower circumferential stiffening structures 66. The stiffener depth dimension 122 of the vertical stiffening structure 68 is preferably about 0.50 inches so as to smoothly transition from the upper and lower circumferential stiffening structures 66 to the vertical stiffening structure 68.

Figure 4C:
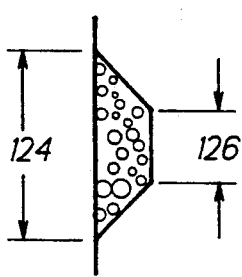
FIG. 4c is a cross-sectional view along line 4c—4c of FIG. 4b.

FIG. 4c depicts a cross section of the duct wall portion 26W along section 4c–4c of FIG. 4b at the location of a vertical stiffening structure 68. The vertical stiffening structure 68 is trapezoidal in shape with a base width dimension 124 of approximately 2.0 inches and a top width dimension 126 of approximately 1.0 inches. The vertical stiffening structure 68 is tapered along the depth for ease of manufacture. The core 69 of the vertical stiffening structure 68 is disposed within the ply is preferably about 0.50 inches so as to form a smooth transition from the upper and lower circumferential stiffening structures 66 to the duct stiffening structure 70. The duct stiffening structure 70 is placed atop and bonded to the six ply layup of the duct wall portion 26W with the face sheet 128 facing outboard.

Each pair of bulkhead structures 48 (only one is shown in FIG. 4d), is bonded onto the open-faced annular structure 58 within the internal cavity 64. The bulkhead pairs 48 acting in conjunction with the duct stiffening structure 70, and the open-faced annular structure 58 form a substantially rigid box structure for attachment of the strut member 24. The bulkheads are preferably formed from nine plies of graphite/epoxy having a thickness of about 0.045 inches. The shape of the bulkheads 48 approximately defines the shape of the toroidal fuselage structure 20. The bulkheads 48 furthermore have flange portions 134, 136, 138 corresponding to the duct wall portion 26W, the dorsal portion 74, and the closure portion 76 respectively. Flange portions 134 and 136 serve the purpose of attaching the bulkhead 48 to the open-faced annular C-shaped structure 58 in the internal cavity 64. The flange portion 138 provides a means for attaching the removable panel structure 56 to the toroidal fuselage structure 20. The flange portions are fabricated from graphite/epoxy ply layups and are preferably formed integral with bulkhead structure.

Also shown in FIG. 4d is the horizontal support plate 40, which is utilized for mounting the heaviest vehicle subsystems 200 and mission payload equipment 100 and transfers the equipment loads to the pair of bulkhead structures 48. The horizontal support plate 40 also acts as an additional stiffening member in rigidizing the box structure formed by the pair of bulkhead structures 48 and associated structure. The horizontal support plate 40 is preferably fabricated from graphite/epoxy material and is affixed to the side wall portions 49 of a pair of bulkhead structures 48. Within the first region 50, it is preferable to add three additional plies to the duct wall portion 26W and dorsal portion 74 to increase the local stiffness of the region.

Figure 5:
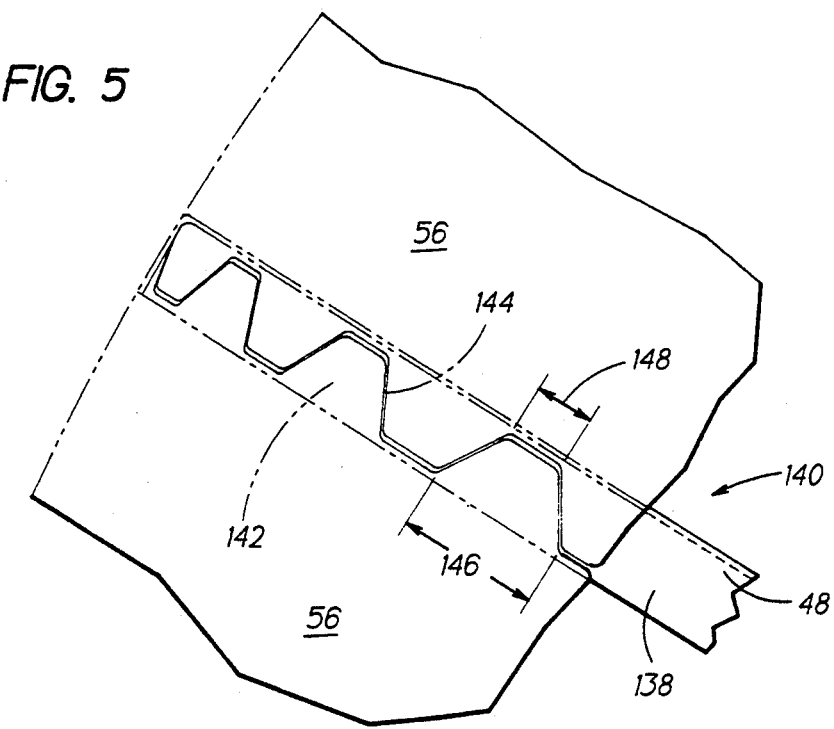
FIG. 5 is an enlarged view of the mating interface of the panel structures of the present invention.

FIG. 5 shows an enlargement of the attachment of the removable panel structures 56 of the closure portion 76 to a bulkhead pair 48. For the purpose of minimizing the aircraft weight, adjacent removable panel structures 56 form a corresponding mating interface 140 for attaching the same to the flange portion 138 of the bulkheads 48. The mating interface 140 has a generally saw-tooth configuration wherein each tooth segment 142 of a removable panel structure 56 mates with a corresponding valley region 144 of the adjacent removable panel structure 56. Each tooth segment 142 of the removable panel structure 56 is secured to the underlying flange portion 138 preferably by a screw or other fastening means. The base width dimension 146 of the tooth segment is approximately 2.0 inches, and the tip width dimension 148 is approximately 1.0 inches. The corresponding valley region 144 is necessarily larger in size than mating tooth section so as to provide a tight interface therebetween.

A variety of modifications and variations of the present invention are possible in light of the above teachings. It is therefore to be understood that, within the scope of the appended claims, the present invention may be practiced otherwise than as specifically described hereinabove.

What is claimed is:

1. A toroidal fuselage structure for an unmanned aerial vehicle having a rotor assembly having ducted, coaxial counter-rotating rotors defining respective tip path planes, the rotor assembly being supported by a plurality of radially oriented strut members, each strut member having a longitudinal axis, wherein said toroidal fuselage structure comprises:

an open faced annular structure having a generally C-shaped cross-section and forming a duct wall portion that defines a duct for said toroidal fuselage structure, said C-shaped annular structure having first and second ends and forming an internal cavity;

a plurality of pairs of bulkhead structures disposed in combination with said open-faced annular structure within said internal cavity formed by said open-faced annular structure and equally spaced therein, said plurality of pairs of bulkhead structures corresponding in number to the plurality of radially oriented strut members, each pair of said plurality of bulkhead structures defining a first region, adjacent pairs of said plurality of bulkhead structures defining a second region, said second region being larger than said first region, and wherein the rotor assembly is coaxially mounted within said duct by means of the plurality of radially oriented struts members mounted to said duct wall portion in said respective first regions defined by said pairs of bulkhead structures so that said first regions are intersected by the longitudinal axes of the corresponding strut members; and removable panel structures attached to said first and second ends of said C-shaped annular structure, said C-shaped annular structure and said removable panel structures in combination forming said toroidal fuselage structure of the unmanned aerial vehicle.

2. The toroidal fuselage structure of claim 1 wherein each said first region forms a sector of about 30 degrees to about 45 degrees.

3. The toroidal fuselage structure of claim 1 wherein each said first region forms a sector of about 30 degrees and each said second region forms a sector of about 90 degrees.

4. The toroidal fuselage structure of claim 1 further comprising a plurality of vertical stiffening structures integrally formed on said duct wall portion of said C-shaped annular structure in facing relation to said internal cavity.

5. The toroidal fuselage structure of claim 1 further comprising at least one circumferential stiffening structure integrally formed on said duct wall portion of said C-shaped annular structure in facing relation to said internal cavity.

6. The toroidal fuselage structure of claim 1 further comprising a duct stiffening structure formed on said duct wall portion of each said first region of said C-shaped annular structure in facing relation to said internal cavity.

7. The toroidal fuselage structure of claim 4 wherein said vertical stiffening structures are located in said second region of said internal cavity and are separated by about 15 degrees.

8. The toroidal fuselage structure of claim 4 further comprising at least one vertically oriented mounting plate affixed to at least two of said vertical stiffening members.

9. The toroidal fuselage structure of claim 4 further comprising upper and lower circumferential stiffening structures integrally formed on said duct wall portion of said C-shaped annular structure in facing relation to said internal cavity, and wherein said vertical stiffening structures are disposed between said upper and lower circumferential stiffening structures.

10. The toroidal fuselage structure of claim 5 further comprising at least one rub strip member, and wherein said at least one circumferential stiffening structure forms a pocket in said duct wall portion in facing relation to said duct for said at least one rub strip member.

11. The toroidal fuselage structure of claim 10 wherein said rub strip member lies in one of the tip path planes defined by the ducted, coaxial counter-rotating rotors.

12. The toroidal fuselage structure of claim 1 wherein adjacent ones of said removable panel structures form a corresponding mating interface, said mating interface aligning with one of said bulkhead structures wherein said mating interface is attached to said one bulkhead structure.

13. The toroidal fuselage structure of claim 12 wherein said mating interface has a generally sawtooth configuration.

14. The toroidal fuselage structure of claim 1 wherein the plurality of radially oriented strut members comprises three strut members, and wherein said plurality of pairs of bulkhead structures comprises three pairs of bulkhead structures.

15. The toroidal fuselage structure of claim 1 further comprising:

upper and lower circumferential stiffening structures integrally formed on said duct wall portion of said C-shaped annular structure in facing relation to said internal cavity, each of said upper and lower circumferential stiffening structures forming a pocket in said duct wall portion in facing relation to said duct; and upper and lower rub strip members;

said upper and lower rub strip members being disposed in said pockets formed by said upper and lower circumferential stiffening structures wherein said upper and lower rub strip members lie in the respective tip path planes defined by the ducted, coaxial counter-rotating rotors.

* * * * *